United States Patent
Fukasawa et al.

(10) Patent No.: US 12,044,998 B2
(45) Date of Patent: Jul. 23, 2024

(54) STAPLELESS BINDER WITH ENHANCED BINDING FORCE

(71) Applicant: Hewlett-Packard Development Company, L.P., Spring, TX (US)

(72) Inventors: Eiji Fukasawa, Pangyo (KR); Seounguk Han, Seongnam Si (KR); Jeong-Yeon Park, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 79 days.

(21) Appl. No.: 17/911,217

(22) PCT Filed: Aug. 3, 2020

(86) PCT No.: PCT/US2020/044715
§ 371 (c)(1),
(2) Date: Sep. 13, 2022

(87) PCT Pub. No.: WO2021/183175
PCT Pub. Date: Sep. 16, 2021

(65) Prior Publication Data
US 2023/0108507 A1 Apr. 6, 2023

(30) Foreign Application Priority Data
Mar. 13, 2020 (KR) .................. 10-2020-0031150

(51) Int. Cl.
*B65H 37/04* (2006.01)
*G03G 15/00* (2006.01)

(52) U.S. Cl.
CPC ......... *G03G 15/6544* (2013.01); *B65H 37/04* (2013.01); *B65H 2301/5162* (2013.01)

(58) Field of Classification Search
CPC ...... G03G 15/6544; G03G 2215/00852; B31F 5/02; B31F 2201/0754; B65H 37/04; B65H 2301/5162; B65H 2301/43828; B65H 2301/43822; B65H 2301/51614; B65H 2301/51616
USPC ...................................... 270/58.08
See application file for complete search history.

(56) References Cited

U.S. PATENT DOCUMENTS

| 3,481,830 | A | * | 12/1969 | Karl | ................ D21F 11/12 425/348 R |
| 5,980,676 | A | | 11/1999 | Meetze | |
| 7,866,645 | B2 | * | 1/2011 | Fujita | ................ G03G 15/6544 270/58.08 |
| 9,944,488 | B2 | | 4/2018 | Kunieda et al. | |
| 9,969,144 | B1 | | 5/2018 | Awano | |
| 10,406,772 | B2 | * | 9/2019 | Takahashi | ................ B42C 1/12 |

(Continued)

FOREIGN PATENT DOCUMENTS

| CN | 105398866 A | 3/2016 |
| JP | 3481300 B2 | 12/2003 |
| JP | 2013-154989 A | 8/2013 |

(Continued)

*Primary Examiner* — Leslie A Nicholson, III
(74) *Attorney, Agent, or Firm* — Brooks, Cameron & Huebsch, PLLC (57) ABSTRACT

A post-processing device includes a paper alignment tray on which a plurality of papers is aligned and a stapleless binder including a stapleless binding portion to compress and bind the plurality of papers and a nozzle in the stapleless binding portion that supplies water vapor to the plurality of papers.

15 Claims, 7 Drawing Sheets

(56) References Cited

U.S. PATENT DOCUMENTS

2014/0339754 A1 11/2014 Abe et al.
2018/0339485 A1 11/2018 Takahashi et al.

FOREIGN PATENT DOCUMENTS

| JP | 2014-139643 A | 7/2014 |
| JP | 2014-177319 A | 9/2014 |
| JP | 2014-240126 A | 12/2014 |
| JP | 2016-175742 A | 10/2016 |
| JP | 2019-127351 A | 8/2019 |

* cited by examiner

STAPLELESS BINDER WITH ENHANCED BINDING FORCE

BACKGROUND

A post-processing device is a device that performs a post-processing operation on a sheet-like medium, for example, paper. The post-processing device may be a stand-alone device. The post-processing device may be connected to a printing device and thus may form an image forming apparatus and may perform a post-processing operation on a print medium that has been printed as a subsequent process of a printing operation to be performed by the printing device.

The post-processing device may include a staple binder that places a binding staple on an edge or corner of a paper stack in which several sheets of paper are aligned. The post-processing device may include a stapleless binder that does not use the binding staple. The stapleless binder places a paper stack between a pair of compression teeth portions facing up and down and binds the paper stack by compressing one edge of the paper stack with the pair of compression teeth portions.

DETAILED DESCRIPTION OF EXAMPLES

Hereinafter, examples of a post-processing device will be described with reference to the drawings. Like reference numerals in the drawings represent like elements, and the size or thickness of each element may be exaggerated for clarity.

Figure 1:
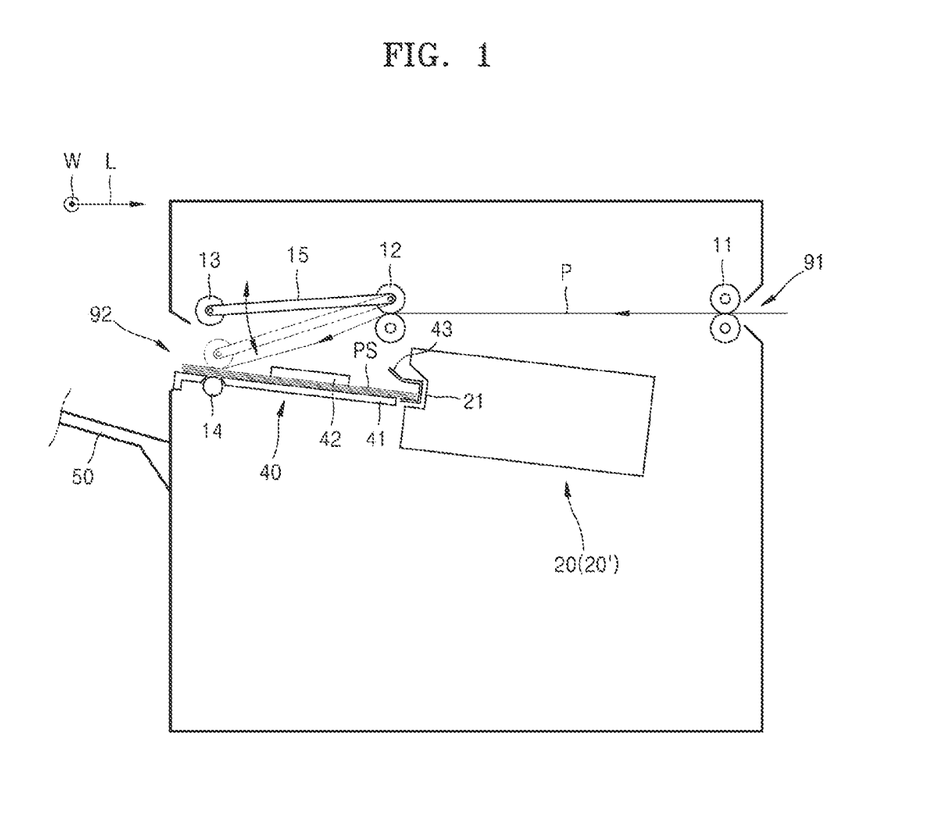
FIG. 1 is a schematic side configuration diagram of an example of a post-processing device.
Figure 2:
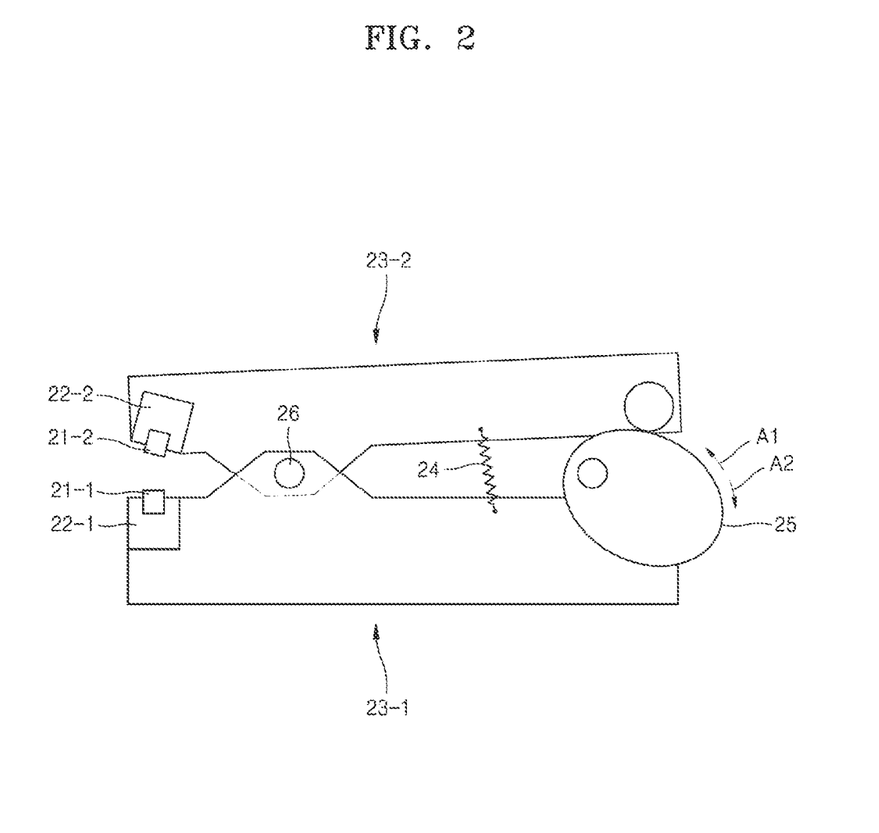
FIG. 2 is a schematic configuration diagram of an example of a stapleless binder shown in FIG. 1 and shows a state in which a stapleless binding portion is located at a retreat position.
Figure 3:
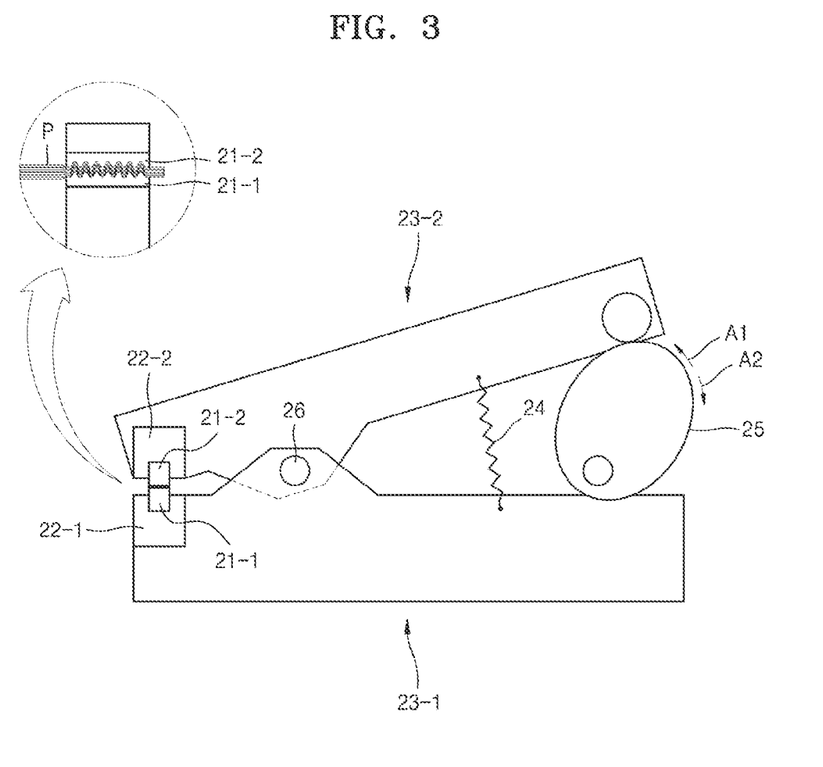
FIG. 3 is a schematic configuration diagram of an example of a stapleless binder shown in FIG. 1 and shows a state in which the stapleless binding portion is located at a binding position.
Figure 4:
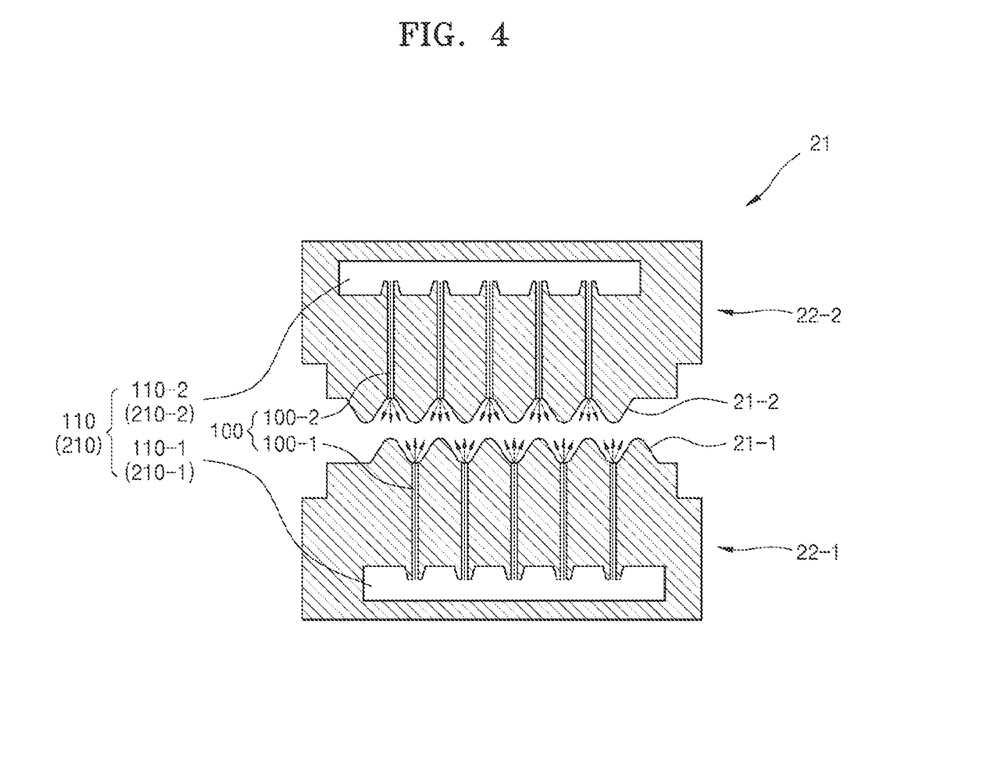
FIG. 4 is a front view showing an example of a stapleless binding portion.

FIG. 1 is a schematic side configuration diagram of an example of a post-processing device. FIGS. 2 and 3 are schematic configuration diagrams of an example of a stapleless binder 20 shown in FIG. 1, and in detail, FIG. 2 shows a state in which a stapleless binding portion 21 is located at a retreat position, and FIG. 3 shows a state in which the stapleless binding portion 21 is located at a binding position. FIG. 4 is a front view showing an example of the stapleless binding portion 21.

Referring to FIGS. 1 through 4, the post-processing device may include a paper alignment tray 40 on which a plurality of papers P is aligned. The stapleless binder 20 can include a stapleless binding portion 21 that compresses and binds the plurality of papers P. The stapleless binder 20 may include a nozzle 100 in the stapleless binding portion 21 that supplies water vapor to the plurality of papers P.

In some examples, the paper alignment tray 40 may include a loading table 41 on which the plurality of papers P is loaded, a side guide 42, and an end guide 43 that align both ends of a widthwise direction W of the papers P and one end of a lengthwise direction L of the papers P, respectively.

Referring to FIG. 1, a transporting structure for transporting the papers P may be provided in the post-processing device. In some examples, the transporting structure for transporting the papers P may include transporting rollers 11 and 12, a first roller 13, and a second roller 14. Each of the transporting rollers 11 and 12 may include a pair of rollers that are rotated in engagement with each other and may transport the papers P introduced through an inlet 91. In some examples, the first roller 13 may be positioned above the loading table 41, and the second roller 14 may be positioned below the loading table 41. For example, the second roller 14 may be positioned at a position in which it may be in contact with a sheet of medium on the loading table 41, for example, a bottom surface of the papers P.

The first roller 13 may face the second roller 14 in some examples. The first roller 13 may change into a separation position (e.g., shown by solid lines of FIG. 1) in which the first roller 13 is apart from the second roller 14 and a transporting position (e.g., shown by alternate long and two short dashes lines in FIG. 1) in which the first roller 13 is engaged with the second roller 14 and transports the papers P or a paper stack PS. For example, the first roller 13 may be installed on a rotation lever 15. The rotation lever 15 may be rotated by an actuator, such as a solenoid, a linear motor, a rotation motor or the like, so the first roller 13 may change into the separation position and the transporting position. At the transporting position, the first roller 13 may be pressed toward the second roller 14 by gravity or an elastic force of a spring (not shown). In some examples, the first roller 13 and the second roller 14 may transport the papers P in a forward direction and may discharge the papers P to a discharge tray 50. For binding processing, the first roller 13 and the second roller 14 may transport the papers P in an opposite direction to align the papers P on the loading table 41. The first roller 13 and the second roller 14 may transport the plurality of papers P that have been bound in the forward direction to discharge the papers P to the discharge tray 50. In some examples, the transporting rollers 11 and 12 and the first and the second rollers 13 and 14 may be driven by one or more motors.

The stapleless binder 20 may include the stapleless binding portion 21 that compresses and binds the plurality of papers P on the paper alignment tray 40 without using a binding staple in some examples. The post-processing device may include a driving unit (not shown) that moves the stapleless binder 20 along one edge of the lengthwise direction L of the papers P in the widthwise direction W. In some instances, the driving unit may include a belt that travels in the widthwise direction W. The stapleless binder 20 may be connected to the belt and may be moved along one edge of the lengthwise direction L of the papers P in the widthwise direction W. The stapleless binder 20 may perform a compression binding operation at a position among one side corner, another side corner, and between two corners along edges of the plurality of papers P in some examples. The plurality of papers P that have been compressed and bound may be discharged by the first and the second rollers 13 and 14 to the discharge tray 50 via an outlet 92.

Referring to FIG. 4, the stapleless binding portion 21 may include a first binding block 22-1 including a first compression teeth portion 21-1 and a second binding block 22-2 including a second compression teeth portion 21-2 having a complementary shape to the first compression teeth portion 21-1. In some instances, the first and the second compression teeth portions 21-1 and 21-2 may face each other with the plurality of papers P on the paper alignment tray 40 therebetween. For example, each of the first and the second compression teeth portions 21-1 and 21-2 may include a plurality of concave portions and a plurality of convex portions arranged alternately. The plurality of concave portions and the plurality of convex portions of the first compression teeth portion 21-1 may face the plurality of convex portions and the plurality of concave portions of the second compression teeth portions 21-2. In an example in which edges of the plurality of papers P are located between the first and the second compression teeth portions 21-1 and 21-2, the first and the second compression teeth portions 21-1 and 21-2 may approach each other and may compress edges of the plurality of papers P, so the plurality of papers P may be compressed and bound.

In some examples, the first compression teeth portion 21-1 may be located below the plurality of papers P, and the second compression teeth portion 21-2 may be located above the plurality of papers P. In such examples, when compression binding is performed, the first compression teeth portion 21-1 may be located at a fixed position, and the second compression teeth portion 21-2 may approach the first compression teeth portion 21-1.

Referring to FIGS. 2 and 3, the stapleless binder 20 may include a first frame 23-1 having the first binding block 22-1, and a second frame 23-2 that has the second binding block 22-2. The second frame 23-2 may change into a first position (FIG. 3) in which the first compression teeth portion 21-1 and the second compression teeth portion 21-2 are engaged with each other and a second position (FIG. 2) in which the first compression teeth portion 21-1 and the second compression teeth portion 21-2 are apart from each other. In some examples, the stapleless binder 20 can include an elastic member 24 that acts an elastic force on the second frame 23-2 in a direction in which the elastic member 24 is located at the second position. The stapleless binder 20, in some instances, can include a binding cam 25 that allows the second frame 23-2 to change from the second position into the first position during forward rotation and the second frame 23-2 to change into the second position by an elastic force of the elastic member 24 during reverse rotation.

In some examples, the first frame 23-1 may be a fixed frame, and the second frame 23-2 may be a movable frame. The second frame 23-2 may be connected to the first frame 23-1 to be rotatable around a hinge 26. Referring to FIG. 2, the second frame 23-2 may be located at the second position. The stapleless binding portion 21 may be located at a retreat position in which the first compression teeth portion 21-1 and the second compression teeth portion 21-2 are apart from each other. When the binding cam 25 is rotated in the forward direction A1, the second cam 25 can push and rotate the second frame 23-2 so the second compression teeth portion 21-2 may approach the first compression teeth portion 21-1. When the second frame 23-2 reaches the first position, as shown in FIG. 3, the first compression teeth portion 21-1 and the second compression teeth portion 21-2 may be engaged with each other, and the stapleless binding portion 21 may reach the binding position. The plurality of papers P may be compressed between the first compression teeth portion 21-1 and the second compression teeth portion 21-2 so compression binding may be completed. In some examples, when the binding cam 25 is reversely rotated in the opposite direction A2 (e.g., by the elastic force of the elastic member 24), the second frame 23-2 may be rotated in a direction in which the second compression teeth portion 21-2 is apart from the first compression teeth portion 21-1, and when the second frame 23-2 is returned to the second position, the stapleless binding portion 21 may be returned to the retreat position, as shown in FIG. 2. In some instances, the first compression teeth portion 21-1 and the second compression teeth portion 21-2 may be separated from the plurality of papers P, and the compressed and bound papers P may be discharged by the first roller 13 and the second roller 14 to the discharge tray 50.

In some examples, a nozzle 100 may be in the stapleless binding portion 21, as shown in FIG. 4. Water may be supplied to the plurality of papers P through the nozzle 100. For instance, water may be supplied to an area (a binding area) in which the papers P are to be bound. The binding area may be an area in which the papers P are compressed by the first and the second compression teeth portions 21-1 and 21-2.

In some examples, water vapor may be supplied to the plurality of papers P through the nozzle 100. Water vapor may be penetrated into the binding area of the plurality of papers P so the binding area may be softened. When the compression binding operation is performed in such examples, the softened binding area of the plurality of papers P may be transformed by the first compression teeth portion 21-1 and the second compression teeth portion 21-2 so solid compression binding is possible. In some examples, water vapor may be penetrated into the fibrous interior of the papers P without excessively wetting the surface of the papers P, so the binding area of the papers P may be softened. Water that remains on the surface of the papers P may increase a frictional force between the papers P loaded on the paper alignment tray 40. Because examples of the present disclosure allow for water vapor to be penetrated into the fibrous interior of the papers P without excessively wetting the surface of the papers P, the amount of water that remains on the surface of the papers P may be reduced. An increase in the frictional force between the plurality of papers P when the plurality of papers P are loaded on the paper alignment tray 40, may be reduced, so the plurality of papers P may be aligned on the paper alignment tray 40.

Hereinafter, examples of a structure for supplying water vapor through the nozzle 100 will be described.

Figure 5:
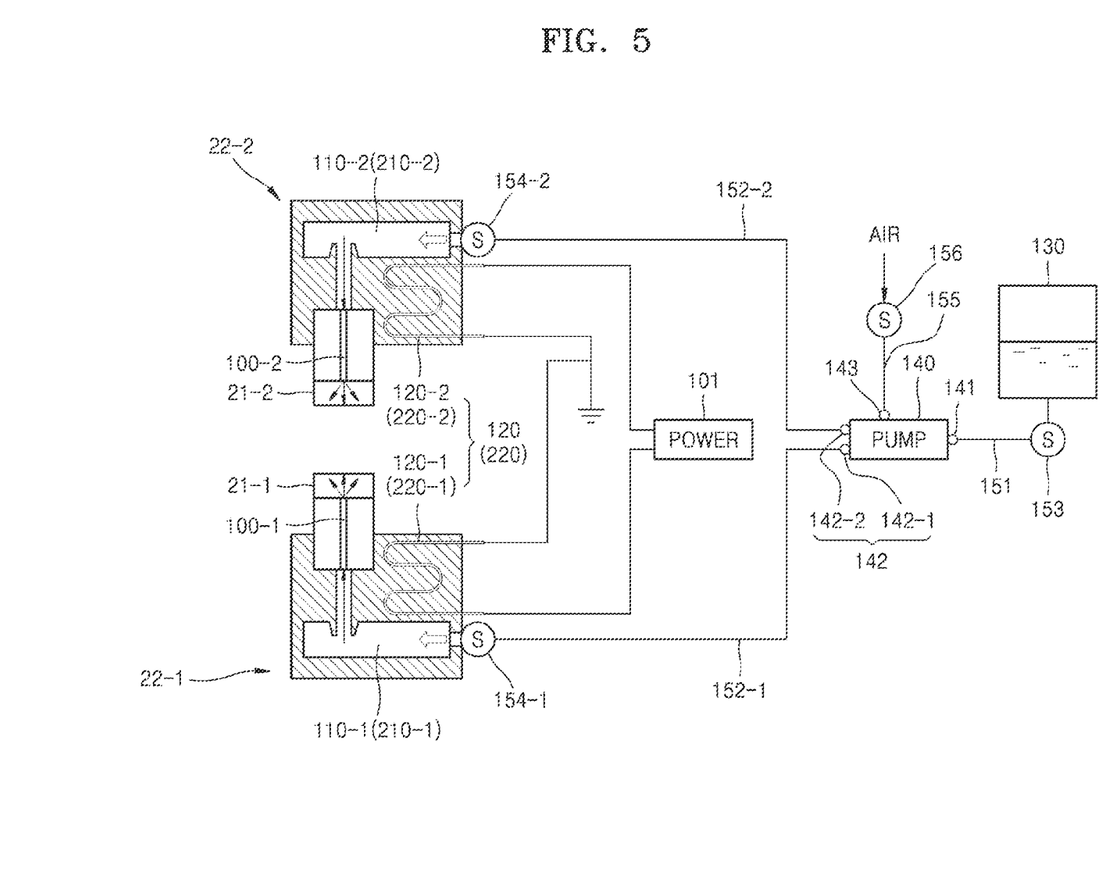
FIG. 5 is a schematic configuration diagram of an example of a water vapor supply structure.

FIG. 5 is a schematic configuration diagram of an example of a water vapor supply structure. Referring to FIGS. 4 and 5, the nozzle 100 may be provided in at least one of the first compression teeth portion 21-1 and the second compression teeth portion 21-2. In some instances, a vaporization chamber 110 connected to the nozzle 100 may be provided on at least one of the first binding block 22-1 and the second binding block 22-2. A heater 120 that heats water in the vaporization chamber 110 to form water vapor may be provided on at least one of the first binding block 22-1 and the second binding block 22-2.

In some examples, the heater 120 may heat at least one of the first compression teeth portion 21-1 and the second compression teeth portion 21-2. The heater 120 may heat at least one of the first compression teeth portion 21-1 and the second compression teeth portion 21-2 in examples in which the first compression teeth portion 21-1 and the second compression teeth portion 21-2 are engaged with each other. The heater 120 may heat air inside the vaporization chamber 110 to supply warm air to the nozzle 100.

The post-processing device may include a water tank 130 to accommodate water, and a pump 140 that supplies water inside the water tank 130 to the vaporization chamber 110. The pump 140 may supply water and air to the vaporization chamber 110 in some instances.

In some examples, the nozzle 100 may be provided in one of the first compression teeth portion 21-1 and the second compression teeth portion 21-2. In such examples, a second nozzle 100-2 may be provided in the second compression teeth portion 21-2 located above the papers P. A second vaporization chamber 110-2 and a second heater 120-2 may be provided on the second binding block 22-2 in which the second compression teeth portion 21-2 is located. In the examples, water vapor may be supplied to a top surface of the plurality of papers P sequentially loaded on the paper alignment tray 40 through the second nozzle 100-2. When air is supplied to the second vaporization chamber 110-2, the second heater 120-2 may heat air inside the second vaporization chamber 110-2 to supply warm air to the second nozzle 100-2. The heater 120 may include a first heater 120-1 and the second heater 120-2 on the first binding block 22-1 and the second binding block 22-2 to heat the first compression teeth portion 21-1 and the second compression teeth portion 21-2.

Referring to FIGS. 4 and 5, the nozzle 100 according to the present example may include a first nozzle 100-1 and the second nozzle 100-2 that are provided in each of the first compression teeth portion 21-1 and the second compression teeth portion 21-2. The first nozzle 100-1 and the second nozzle 100-2 may be provided in the concave portions of the first compression teeth portion 21-1 and the second compression teeth portion 21-2, for example. The vaporization chamber 110 may include a first vaporization chamber 110-1 and the second vaporization chamber 110-2 on the first binding block 22-1 and the second binding block 22-2, respectively.

In some examples, the heater 120 may include a first heater 120-1 and a second heater 120-2 on the first binding block 22-1 and the second binding block 22-2, respectively. The first heater 120-1 may be located adjacent to the first vaporization chamber 110-1 and the first compression teeth portion 21-1 to heat the first vaporization chamber 110-1 and the first compression teeth portion 21-1. The second heater 120-2 may be located adjacent to the second vaporization chamber 110-2 and the second compression teeth portion 21-2 to heat the second vaporization chamber 110-2 and the second compression teeth portion 21-2. A power supply unit 101 may supply power to the first heater 120-1 and the second heater 120-2. The power supply unit 101 may supply power to the first heater 120-1 and the second heater 120-2 in some examples.

The pump 140 may include a water intake 141 connected to the water tank 130 and an outlet 142 connected to the vaporization chamber 110. In some examples, the outlet 142 may include a first outlet 142-1 connected to the first vaporization chamber 110-1 and a second outlet 142-2 connected to the second vaporization chamber 110-2. A supply path 151 may connect the water tank 130 to the water intake 141. A first discharge path 152-1 may connect the first outlet 142-1 to the first vaporization chamber 110-1. A second discharge path 152-2 may connect the second outlet 142-2 to the second vaporization chamber 110-2. A check valve (not shown) may be installed at the water intake 141 so water may flow in a direction in which water is supplied to the pump 140. In some examples, a check valve (not shown) may be installed at the first outlet 142-1 and the second outlet 142-2 so water may flow in a direction in which water is discharged from the pump 140. A switching valve 153 may open and close the supply path 151. Switching valves 154-1 and 154-2 may open and close the first discharge path 152-1 and a second discharge path 152-2.

In some examples, the pump 140 may supply water and air to the vaporization chamber 110. The pump 140 may further include an air intake 143 for sucking air in some instances. A check valve (not shown) may be installed at the air intake 143 so air may flow in a direction in which air is supplied to the pump 140. A switching valve 156 may open and close an air intake path 155 connected to the air intake 143 in some examples. The pump 140 may supply air to the first and the second vaporization chambers 110-1 and 110-2 through the first and the second discharge paths 152-1 and 152-2. The first and the second heaters 120-1 and 120-2 may heat air inside the first and the second vaporization chambers 110-1 and 110-2 in some examples. Heated air, (e.g., warm air) may be sprayed onto the papers P through the first and the second nozzles 100-1 and 100-2.

Figure 6:
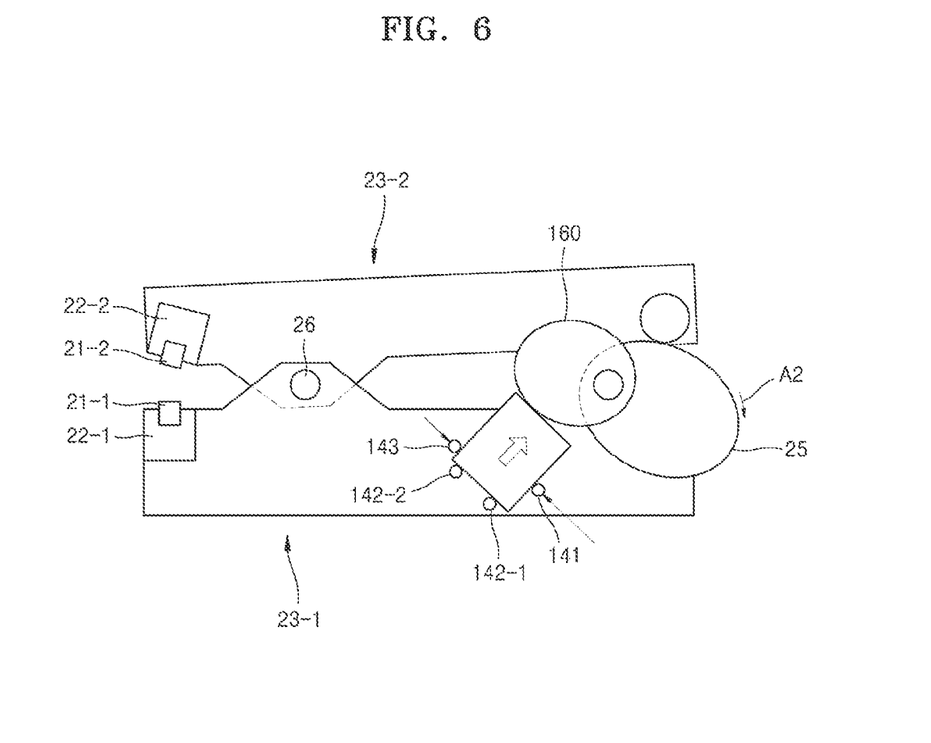
FIG. 6 is a schematic configuration diagram of an example of a structure for driving a pump and shows a state in which the pump is relaxed.
Figure 7:
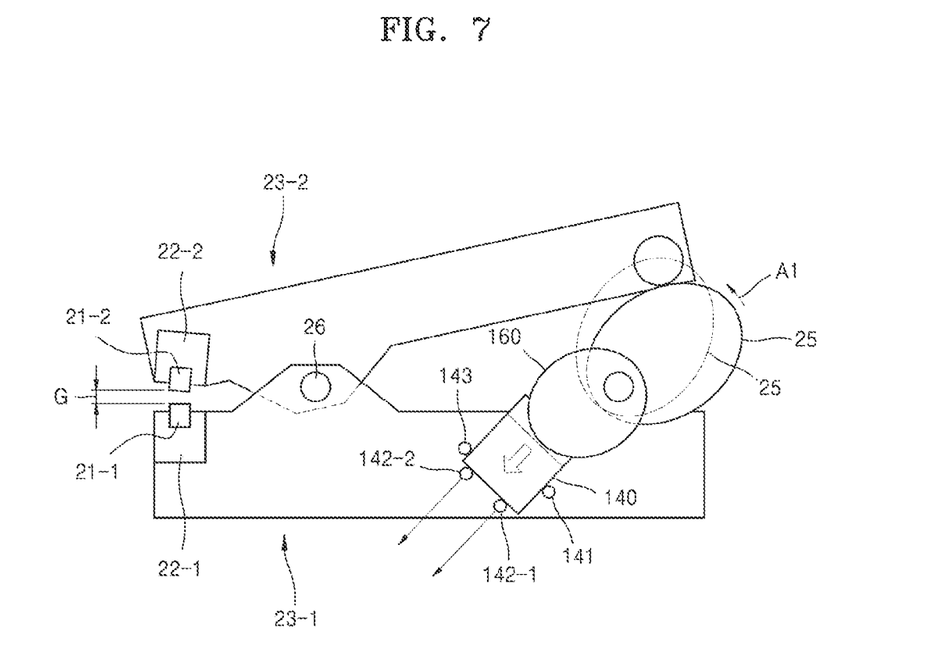
FIG. 7 is a schematic configuration diagram of an example of a structure for driving a pump and shows a state in which the pump is contracted.

FIGS. 6 and 7 are schematic configuration diagrams of an example of a structure for driving the pump 140, with FIG. 6 showing a state in which the pump 140 is relaxed, and FIG. 7 showing a state in which the pump 140 is contracted. The pump 140 may be driven in association with forward rotation and reverse rotation of the binding cam 25.

Referring to FIGS. 6 and 7, a pumping cam 160 that is rotated together with the binding cam 25 is shown. In some examples, the pumping cam 160 may be installed on a rotation shaft of the binding cam 25 and rotated together with the binding cam 25. The pumping cam 160 may contract the pump 140 when the pumping cam 160 is forwardly rotated in the forward direction A1 together with the binding cam 25. The pumping cam 160 may relax the pump 140 when the pumping cam 160 is reversely rotated in the reverse direction A2 together with the binding cam 25. As used herein, contracting of the pump 140 means that water or air is discharged from the pump 140 through the first and the second outlets 142-1 and 142-2 and relaxing of the pump 140 means that water or air is sucked into the pump 140 through the water intake 141 or the air intake 143. For instance, when the stapleless binding portion 21 is changed into the binding position from the retreat position, water or air may be discharged from the pump 140 to the first and the second vaporization chambers 110-1 and 110-2, and when the stapleless binding portion 21 is changed into the retreat position from the binding position, water or air may be introduced from the pump 140. For example, a bellows pump for discharging/sucking fluid may be employed as the pump 140 through a contraction/relaxation action.

In some examples, when the pump 140 is contracted, the pumping cam 160 may be forwardly rotated until a pumping position before the stapleless binding portion 21 is changed (e.g., completely changed) into the binding position in the forward direction A1, as shown in FIG. 7. When the pumping cam 160 is located at the pumping position, a gap G between the first compression teeth portion 21-1 and the second compression teeth portion 21-2 may be greater than a thickness of a threshold number of papers P that may be compression-bound.

Through this configuration, the pump 140 may be operated by using a motor (not shown) for driving the binding cam 25, so manufacturing costs may be reduced. Although not shown, an additional driving motor may also be employed to drive the pump 140.

Examples described further herein can include a compression binding method having the above-described configuration.

In some examples, during preparation, water vapor may be generated by supplying water to the vaporization chamber 110 and heating water by using the heater 120. The switching valve 153 may be operated to open the supply path 151. The first and the second discharge paths 152-1 and 152-2 may be opened by using the switching valve 154-1 and the switching valve 154-2. Water may be supplied from the water tank 130 to the first and the second vaporization chambers 110-1 and 110-2. In some examples, the pumping cam 160 may be forwardly/reversely rotated so water may be supplied to the first and the second vaporization chambers 110-1 and 110-2. Current may be supplied to the first and the second heaters 120-1 and 120-2, in some instances, so water inside the first and the second vaporization chambers 110-1 and 110-2 may be heated to generate water vapor.

In some examples, the plurality of papers P may be loaded on the paper alignment tray 40. In such examples, water vapor may be supplied to the papers P to soften the papers P. A first paper P may be loaded on the paper alignment tray 40 by using the transporting rollers 11 and 12 and the first and the second rollers 13 and 14. In some examples, the pumping cam 160 may be forwardly/reversely rotated so water may be supplied to the first and the second vaporization chambers 110-1 and 110-2 by using the pump 140. By pressure provided by the pump 140, water vapor inside the first and the second vaporization chambers 110-1 and 110-2 may be sprayed onto the first paper P through the first and the second nozzles 100-1 and 100-2. Water vapor may be penetrated into the first paper P so the binding area of the first paper P may be softened. In some examples, subsequent to the stapleless binding portion 21 being changed into the retreat position, a second paper P may be loaded on the paper alignment tray 40 by using the transporting rollers 11 and 12 and the first and the second rollers 13 and 14. Because a reduced amount of moisture remains on the surface of the first paper P, change in the frictional force between the first paper P and the second paper P may be reduced, and the second paper P may be loaded on the first paper P. In some examples, the pump 140 may be operated so water vapor may be sprayed onto the second paper P through the first and the second nozzles 100-1 and 100-2, and the binding area of the second paper P may be softened. This may be repeated until a last paper P. In some examples, when water vapor is sprayed onto the papers P after the second paper P, water vapor may be sprayed through the second nozzle 100-2 alone, which faces the top surface of the paper P. In such examples, the first discharge path 152-1 may be blocked by using the switching valve 154-1. In some instances, when the second nozzle 100-2, the second vaporization chamber 110-2, and the second heater 120-2 alone are provided, water vapor may be supplied to the top surface of the papers P.

The stapleless binding portion 21, in some examples, may change into the binding position so the plurality of papers P may be compressed. When the plurality of papers P are aligned on the paper alignment tray 40, the binding cam 25 may be forwardly rotated so the stapleless binding portion 21 may change into the binding position, as shown in FIG. 3. In response, the plurality of papers P may be compressed between the first and the second compression teeth portions 21-1 and 21-2 and bound to each other. In some instances, because the binding area of the plurality of papers P is softened by water vapor, the plurality of papers P may be compressed between the first and the second compression teeth portions 21-1 and 21-2. This can increase a binding force of the binding area.

In some examples, prior to the stapleless binding portion 21 being changed into the binding position, water may not be supplied to the first and the second nozzles 100-1 and 100-2. In such examples, the power supply unit 101 may cut off power supplied to the first and the second heaters 120-1 and 120-2. When power supplied to the first and the second heaters 120-1 and 120-2 is cut off, water vapor may be no longer generated in the first and the second vaporization chambers 110-1 and 110-2. In some examples, while water vapor is generated, the first and the second compression teeth portions 21-1 and 21-2 may be heated by the first and the second heaters 120-1 and 120-2. When the first and the second compression teeth portions 21-1 and 21-2 are thermally expanded and the stapleless binding portion 21 is changed into the binding position, the first and the second compression teeth portions 21-1 and 21-2 may not be engaged with each other or may be incompletely engaged with each other. In some examples, power supplied to the first and the second heaters 120-1 and 120-2 may be cut off before the stapleless binding portion 21 is changed into the binding position. Because the first and the second compression teeth portions 21-1 and 21-2 are cooled, the first and the second compression teeth portions 21-1 and 21-2 may be engaged with each other when the stapleless binding portion 21 is changed into the binding position. In some examples, the first and the second discharge paths 152-1 and 152-2 may be blocked by using the switching valves 154-1 and 154-2 so no water may be supplied to the first and the second nozzles 100-1 and 100-2, and the supply path 151 may also be blocked by using the switching valve 153.

In some instances, the plurality of papers P may be separated from the stapleless binding portion 21. The binding cam 25 may be reversely rotated so the stapleless binding portion 21 may change into the retreat position. In response, the first and the second compression teeth portions 21-1 and 21-2 may be separated from the plurality of papers P. The plurality of papers P that have been bound may be discharged to the discharge tray 50 by using the first and the second rollers 13 and 14.

In some examples, separating the plurality of papers P from the stapleless binding portion 21 may include supplying warm air to the plurality of papers P through the first and the second nozzles 100-1 and 100-2 to dry the plurality of papers P (e.g., the binding area of the plurality of papers P). In some examples, the supply path 151 may be blocked by using the switching valve 153 so water may not be supplied to the pump 140. The air intake path 155 may be opened by using the switching valve 156. Power may be supplied from the power supply unit 101 to the first and the second heaters 120-1 and 120-2. In some instances, when the pumping cam 160 is forwardly/reversely rotated, air may be sucked through the air intake 143 and supplied to the first and the second vaporization chambers 110-1 and 110-2. Air heated inside the first and the second vaporization chambers 110-1 and 110-2 by the first and the second heaters 120-1 and 120-2 may be supplied to the plurality of papers P (e.g., the binding area of the plurality of papers P) through the first and the second nozzles 100-1 and 100-2. The binding area may be dried by warm air. The stapleless binding portion 21 may change into the binding position and the retreat position in some examples. In response, the first and the second compression teeth portions 21-1 and 21-2 may be separated from the plurality of papers P, and the binding force of the binding area may be increased. The pumping cam 160 may be forwardly/reversely rotated, and the stapleless binding portion 21 may change into the binding position and a compression position several times. In such examples, a force used to separate the first and the second compression teeth portions 21-1 and 21-2 from the plurality of papers P may be reduced.

In some examples, before separating the plurality of papers P from the stapleless binding portion 21, at least one of the first and the second compression teeth portions 21-1 and 21-2 may be heated by using the heater 120 to dry the plurality of papers P (e.g., the binding area of the plurality of papers P). In such examples, the first and the second compression teeth portions 21-1 and 21-2 may be heated by using the first and the second heaters 120-1 and 120-2. In such examples in which the stapleless binding portion 21 is located at the binding position, the power supply unit 101 may supply power to the first and the second heaters 120-1 and 120-2. Because the first and the second compression teeth portions 21-1 and 21-2 are heated in a state in which the plurality of papers P are compressed, moisture penetrated into the plurality of papers P may be evaporated by thermal energy so the binding area of the plurality of papers P may be dried. This can increase the binding force of the binding area. In some examples, before the stapleless binding portion 21 is changed into the retreat position after drying of the binding area has been completed, power supplied to the first and the second heaters 120-1 and 120-2 may be cut off.

In some instances, moisture in a liquid state may be supplied to the plurality of papers P. For instance, water may be supplied to the plurality of papers P through the nozzle 100 so the binding area may be softened.

Referring to FIG. 1, the post-processing device in some examples may include the paper alignment tray 40 on which the plurality of papers P are aligned, and a stapleless binder 20' including the stapleless binding portion 21 that compresses and binds the plurality of papers P. The post-processing device can include the nozzle 100 that is located in the stapleless binding portion 21 and supplies water to the plurality of papers P and a heater 220 to dry moisture of the plurality of papers P. The post-processing device in some examples may include water instead of water vapor supplied to the papers P, as compared to the examples of the post-processing device described with respect to FIGS. 1 through 7, and components thereof are similar. Thus, the post-processing device according to the present example is described further herein with reference to FIGS. 1 through 7. Components used exclusively in the post-processing device according to the present example in FIGS. 1 through 7 are indicated by reference numerals separately in parentheses.

Referring to FIGS. 1 through 7, a stapleless binding portion 21 may include a first binding block 22-1 including a first compression teeth portion 21-1 and a second binding block 22-2 including a second compression teeth portion 21-2 having a complementary shape to the first compression teeth portion 21-1. In some examples, a nozzle 100 may be provided in at least one of the first compression teeth portion 21-1 and the second compression teeth portion 21-2. A heater 220 may be provided on at least one of the first binding block 22-1 and the second binding block 22-2 to heat at least one of the first compression teeth portion 21-1 and the second compression teeth portion 21-2. In some instances, the heater 220 may heat at least one of the first compression teeth portion 21-1 and the second compression teeth portion 21-2 in a state in which the first compression teeth portion 21-1 and the second compression teeth portion 21-2 are engaged with each other.

The post-processing device, in some examples, may include a water tank 130 in which water is accommodated, a water chamber 210 that is provided on at least one of the first binding block 22-1 and the second binding block 22-2 and connected to the nozzle 100, and a pump 140 that supplies water in the water tank 130 to the water chamber 210. The pump 140 may include a water intake 141 connected to the water tank 130, an air intake 143 for sucking air, and an outlet 142 connected to the water chamber 210 and may, in some examples, supply water and air to the water chamber 210. The heater 220 may heat air inside the water chamber 210 to supply warm air to the nozzle 100.

The post-processing device, in some instances, may include a first frame 23-1 having a first binding block 22-1, a second frame 23-2 having a second binding block 22-2. The post-processing device may change into a first position (see FIG. 3) in which the first compression teeth portion 21-1 and the second compression teeth portion 21-2 are engaged with each other, and a second position (see FIG. 2) in which the first compression teeth portion 21-1 and the second compression teeth portion 21-2 are apart from each other. In some examples, the post-processing device can include an elastic member 24 that acts an elastic force on the second frame 23-2 in a direction in which the elastic member 24 is located at the second position. The post-processing device can include, in some instances, a binding cam 25 that allows the second frame 23-2 to change from the second position into the first position during forward rotation and the second frame 23-2 to change into the second position by an elastic force of the elastic member 24 during reverse rotation.

In some examples, the pump 140 may be driven by a pumping cam 160 installed coaxially with the binding cam 25. The pumping cam 160 may contract the pump 140 when the binding cam 25 is forwardly rotated and may relax the pump 140 when the binding cam 25 is reversely rotated.

When the nozzle 100 is provided in one of the first compression teeth portion 21-1 and the second compression teeth portion 21-2, the nozzle 100 may be provided in the second compression teeth portion 21-2 located at an upper portion of the papers P. In some instances, the water chamber 210 and the heater 220 may be provided on the second binding block 22-2 in which the second compression teeth portion 21-2 is located. The heater 220 may also be provided on all of the first binding block 22-1 and the second binding block 22-2 to heat the first compression teeth portion 21-1 and the second compression teeth portion 21-2. In order to supply warm air to the nozzle 100, the water chamber 210 and the heater 220 may be provided on all of the first binding block 22-1 and the second binding block 22-2.

In some examples, the nozzle 100 may include a first nozzle 100-1 and a second nozzle 100-2 in the first compression teeth portion 21-1 and the second compression teeth portion 21-2, respectively. The water chamber 210 may include a first water chamber 210-1 and a second water chamber 210-2 on the first binding block 22-1 and the second binding block 22-2, respectively. In some examples, the heater 220 may include a first heater 220-1 and a second heater 220-2 on the first binding block 22-1 and the second binding block 22-2, respectively. The first heater 220-1 may be located adjacent to the first water chamber 210-1 and the first compression teeth portion 21-1 to heat the first water chamber 210-1 and the first compression teeth portion 21-1. The second heater 220-2 may be located adjacent to the second water chamber 210-2 and the second compression teeth portion 21-2 to heat the second water chamber 210-2 and the first compression teeth portion 21-2. A power supply unit 101, in some instances, may supply power to the first heater 220-1 and the second heater 220-2. The power supply unit 101 may supply power to the first heater 220-1 and the second heater 220-2 in some examples.

The outlet 142 of the pump 140 may include a first outlet 142-1 connected to the first water chamber 210-1 and a second outlet 142-2 connected to the second water chamber 210-2 in some examples. A first discharge path 152-1 may connect the first outlet 142-1 to the first water chamber 210-1. A second discharge path 152-2 may connect the second outlet 142-2 to the second water chamber 210-2. In some instances, a check valve (not shown) may be installed at the water intake 141 so water may flow in a direction in which water is supplied to the pump 140. A check valve (not shown) may be installed at the first outlet 142-1 and the second outlet 142-2 so water may flow in a direction in which water is discharged from the pump 140 in some examples. A switching valve 153 may open and close a supply path 151 that connects the water tank 130 to the water intake 141. Switching valves 154-1 and 154-2 may open and close the first discharge path 152-1 and the second discharge path 152-2. The pump 140 may include the air intake 143 for sucking air in some examples. A check valve (not shown) may be installed at the air intake 143 so air may flow in a direction in which air is supplied to the pump 140 in some instances. The switching valve 156 may open and close the air intake path 155 connected to the air intake 143. The pump 140 may supply air to the first and the second water chambers 210-1 and 210-2 through the first and the second discharge paths 152-1 and 152-2. The first and the second heaters 220-1 and 220-2 may heat air inside the first and the second water chambers 210-1 and 210-2. Heated air, (e.g., warm air) may be sprayed onto the papers P through the first and the second nozzles 100-1 and 100-2.

Examples of the present disclosure can include a compression binding method having the above-described configuration and will be described further herein.

In some examples, during preparation, water may be supplied to the water chamber 210. The switching valve 153 may be operated to open the supply path 151. The first and the second discharge paths 152-1 and 152-2 may be opened by using the switching valves 154-1 and 154-2. In some examples, water may be supplied from the water tank 130 to the first and the second water chambers 210-1 and 210-2. The pumping cam 160 may be forwardly/reversely rotated so water may be supplied to the first and the second water chambers 210-1 and 210-2.

In some examples, the plurality of papers P may be loaded on the paper alignment tray 40. In such examples, water may be supplied to the papers P so the papers P may be softened. A first paper P may be loaded on the paper alignment tray 40 by using transporting rollers 11 and 12 and first and second rollers 13 and 14. The pumping cam 160 may be forwardly/reversely rotated so water may be supplied to the first and the second water chambers 210-1 and 210-2 by using the pump 140. By pressure provided by the pump 140, water inside the first and the second water chambers 210-1 and 210-2 may be sprayed onto the first paper P through the first and the second nozzles 100-1 and 100-2. Water may be used to wet the first paper P so the binding area of the first paper P may be softened. In some examples, subsequent to the stapleless binding portion 21 being changed into the retreat position, a second paper P may be loaded on the paper alignment tray 40 using the transporting rollers 11 and 12 and the first and the second rollers 13 and 14. The pump 140 may be operated to spray water onto the second paper P through the first and the second nozzles 100-1 and 100-2 so the binding area of the second paper P may be softened. This may be repeated until a last paper P. In some examples, when water is sprayed onto the papers P after the second paper P, water may be sprayed through the second nozzle 100-2 alone, which faces the top surface of the paper P, casein such examples, the first discharge path 152-1 may be blocked by using the switching valve 154-1. In examples in which the second nozzle 100-2, the second water chamber 210-2, and the second heater 220-2 alone are provided, water may be supplied to the top surface of the paper P.

In some examples, the stapleless binding portion 21 may change into the binding position to compress the plurality of papers P. When the plurality of papers P is aligned on the paper alignment tray 40, the binding cam 25 may be forwardly rotated so the stapleless binding portion 21 may change into the binding position, as shown in FIG. 3. In such examples, the plurality of papers P may be compressed between the first and the second compression teeth portions 21-1 and 21-2 and bound to each other. Because the binding area of the plurality of papers P is softened by water, the plurality of papers P may be compressed between the first and the second compression teeth portions 21-1 and 21-2. In such examples, the binding force of the binding area may be increased.

In some examples, before the stapleless binding portion 21 is changed into the binding position, water may not be supplied to the first and the second nozzles 100-1 and 100-2. In such examples, the first and the second discharge paths 152-1 and 152-2 may be blocked by using the switching valves 154-1 and 154-2, and the supply path 151 may also be blocked by using the switching valve 153. In some instances, the papers P may be dried, and the plurality of papers P may be separated from the stapleless binding portion 21.

In some examples, at least one of the first and the second compression teeth portions 21-1 and 21-2 may be heated by using the heater 220 so the plurality of papers P (e.g., the binding area of the plurality of papers P) may be dried. In such examples, the first and the second compression teeth portions 21-1 and 21-2 may be heated by using the first and the second heaters 220-1 and 220-2. In such examples when the stapleless binding portion 21 is located at the binding position, the power supply unit 101 may supply power to the first and the second heaters 220-1 and 220-2. Because the first and the second compression teeth portions 21-1 and 21-2 may be heated in a state in which the plurality of papers P are compressed, moisture penetrated into the plurality of papers P may be evaporated by thermal energy so the binding area of the plurality of papers P may be dried. In such examples, the binding force of the binding area may be increased. In some instances, before the stapleless binding portion 21 is changed into the retreat position after drying of the binding area has been completed, power supplied to the first and the second heaters 220-1 and 220-2 may be cut off.

In some examples, the plurality of papers P may be separated from the stapleless binding portion 21. The binding cam 25 may be reversely rotated so the stapleless binding portion 21 may change into the retreat position. In response, the first and the second compression teeth portions 21-1 and 21-2 may be separated from the plurality of papers P. The plurality of papers P that have been bound may be discharged to the discharge tray 50 by using the first and the second rollers 13 and 14.

In some examples, warm air may be supplied to the plurality of papers P through the first and the second nozzles 100-1 and 100-2 so the plurality of papers P (e.g., the binding area of the plurality of papers P) may be dried. The supply path 151 may be blocked by using the switching valve 153 so water may not be supplied to the pump 140. In some instances, the air intake path 155 may be opened using the switching valve 156. Power may be supplied to the first and the second heaters 220-1 and 220-2 from the power supply unit 101. When the pumping cam 160 is forwardly/reversely rotated, air may be sucked through the air intake 143 and supplied to the first and the second water chambers 210-1 and 210-2. Air heated inside the first and the second water chambers 210-1 and 210-2 by the first and the second heaters 220-1 and 220-2 may be supplied to the plurality of papers P (e.g., the binding area of the plurality of papers P) through the first and the second nozzles 100-1 and 100-2. In some examples, the binding area may be dried by warm air. The stapleless binding portion 21 may change into the binding position and the retreat position. In some examples, this is done simultaneously to the drying via warm air. In such examples, the first and the second compression teeth portions 21-1 and 21-2 may be separated from the plurality of papers P. and the binding force of the binding area may be increased. The pumping cam 160 may be forwardly/reversely rotated a number of times, casein such instances, the stapleless binding portion 21 may change into the binding position and the compression position a number of times. In such examples, the first and the second compression teeth portions 21-1 and 21-2 may be separated from the plurality of papers P. In some examples, before warm air is supplied, the first and the second compression teeth portions 21-1 and 21-2 may be heated in a state in which the stapleless binding portion 21 is located at the binding position, using the first and the second heaters 220-1 and 220-2. In such examples, an effectiveness of drying of the plurality of papers P may be increased.

It should be understood that examples described herein should be considered in a descriptive sense and not for purposes of limitation. Descriptions of features or aspects within each example should be considered as available for other similar features or aspects in other examples. While a number of examples have been described with reference to the figures, it will be understood by those of ordinary skill in the art that various changes in form and details may be made therein without departing from the spirit and scope as defined by the following claims.

What is claimed is:

1. A post-processing device comprising:
  a paper alignment tray on which a plurality of papers is aligned;
  a stapleless binder comprising a stapleless binding portion to compress and bind the plurality of papers, wherein the stapleless binding portion comprises a first binding block and a second binding block;
  a heater to heat water to form water vapor, wherein the heater is located on at least one of the first binding block and the second binding block; and
  a nozzle provided in the stapleless binding portion to supply the water vapor to the plurality of papers.

2. The post-processing device of claim 1, wherein:
  first binding block includes a first compression teeth portion and the second binding block includes a second compression teeth portion having a complementary shape to the first compression teeth portion; and
  the nozzle is in at least one of the first compression teeth portion and the second compression teeth portion.

3. The post-processing device of claim 2, further comprising:
  a vaporization chamber on at least one of the first binding block and the second binding block and connected to the nozzle; and
  the heater is to heat water in the vaporization chamber to form the water vapor.

4. The post-processing device of claim 3, further comprising:
  a water tank to accommodate water; and
  a pump to supply the water in the water tank to the vaporization chamber.

5. The post-processing device of claim 4, wherein:
  the pump comprises a water intake connected to the water tank, an air intake to suck air, and an outlet connected to the vaporization chamber to supply water and air to the vaporization chamber; and
  the heater heats the water and the air inside the vaporization chamber.

6. The post-processing device of claim 4, further comprising:
  a first frame comprising the first binding block;
  a second frame comprising the second binding block and to:
    change to a first position in which the first compression teeth portion and the second compression teeth portion are engaged with each other; and
    change to a second position in which the first compression teeth portion and the second compression teeth portion are apart from each other;
  an elastic member to act as an elastic force on the second frame in a direction in which the elastic member is located at the second position;
  a binding cam to allow the second frame to change from the second position into the first position during forward rotation and the second frame to change into the second position by an elastic force of the elastic member during reverse rotation; and
  a pumping cam installed coaxially with the binding cam to:
    contract the pump when the binding cam is forwardly rotated; and
    relax the pump when the binding cam is reversely rotated.

7. The post-processing device of claim 3, wherein the heater heats at least one of the first compression teeth portion and the second compression teeth portion.

8. The post-processing device of claim 7, wherein the heater heats at least one of the first compression teeth portion and the second compression teeth portion in a state in which the first compression teeth portion and the second compression teeth portion are engaged with each other.

9. A post-processing device comprising:
  a paper alignment tray on which a plurality of papers is aligned; and
  a stapleless binder comprising:
    a stapleless binding portion to compress and bind the plurality of papers;
    a nozzle provided in the stapleless binding portion to supply water to the plurality of papers; and
    a heater to dry moisture of the plurality of papers.

10. The post-processing device of claim 9, wherein:
  the stapleless binding portion comprises:
    a first binding block including a first compression teeth portion; and
    a second binding block including a second compression teeth portion having a complementary shape to the first compression teeth portion; and
  the nozzle is in at least one of the first compression teeth portion and the second compression teeth portion.

11. The post-processing device of claim 10, wherein the heater is on at least one of the first binding block and the second binding block and heats at least one of the first compression teeth portion and the second compression teeth portion.

12. The post-processing device of claim 11, wherein the heater heats at least one of the first compression teeth portion and the second compression teeth portion in a state in which the first compression teeth portion and the second compression teeth portion are engaged with each other.

13. A post-processing device comprising:
    a paper alignment tray on which a plurality of papers is aligned; and
    a stapleless binder comprising:
        a stapleless binding portion to compress and bind the plurality of papers;
        a nozzle provided in the stapleless binding portion to supply water to the plurality of papers; and
        a heater to dry moisture of the plurality of papers;
    a water tank to accommodate water;
    a water chamber on at least one of a first binding block of the stapleless binding portion and a second binding block of the stapleless binding portion and connected to the nozzle; and
    a pump to supply water in the water tank to the water chamber.

14. The post-processing device of claim 13, wherein the pump supplies water and air to the water chamber and comprises a water intake connected to the water tank, an air intake to suck air, and an outlet connected to the water chamber; and
    wherein the heater heats air inside the water chamber to supply warm air to the nozzle.

15. The post-processing device of claim 13, further comprising:
    a first frame comprising the first binding block;
    a second frame comprising the second binding block, the second frame to change into a first position in which a first compression teeth portion of the first binding block and a second compression teeth portion of the second binding block are engaged with each other and into a second position in which the first compression teeth portion and the second compression teeth portion are apart from each other;
    an elastic member to act as an elastic force on the second frame in a direction in which the elastic member is located at the second position;
    a binding cam to allow the second frame to change from the second position into the first position during forward rotation and the second frame to change into the second position by an elastic force of the elastic member during reverse rotation; and
    a pumping cam installed coaxially with the binding cam to contract the pump when the binding cam is forwardly rotated and to relax the pump when the binding cam is reversely rotated.

* * * * *